United States Patent [19]
Wiessler et al.

[11] Patent Number: 6,015,962
[45] Date of Patent: Jan. 18, 2000

[54] STUD HOLDER FOR A STUD-WELDING DEVICE

[75] Inventors: Hans Wiessler, Wettenberg; Kurt Liebich, Lich, both of Germany

[73] Assignee: Emhart Inc., Newark, Del.

[21] Appl. No.: 08/941,923

[22] Filed: Oct. 1, 1997

[30] Foreign Application Priority Data

Oct. 2, 1996 [DE] Germany .................. 296 17 208 U

[51] Int. Cl.⁷ .................................................. B23K 9/20
[52] U.S. Cl. ........................................... 219/98; 279/43.2
[58] Field of Search ..................... 219/98, 99; 279/43.1, 279/43.2

[56] References Cited

U.S. PATENT DOCUMENTS

| | | | |
|---|---|---|---|
| 3,854,027 | 12/1974 | Ettinger et al. ........................... | 219/98 |
| 4,562,329 | 12/1985 | Minton ..................................... | 219/98 |
| 4,799,842 | 1/1989 | Kreider et al. . | |

FOREIGN PATENT DOCUMENTS

| | | | |
|---|---|---|---|
| 3201979 | 8/1988 | Germany . | |
| 551720 | 3/1943 | United Kingdom ................. | 219/119 |
| 567170 | 1/1945 | United Kingdom ................. | 279/43.2 |

*Primary Examiner*—Gregory Mills
*Attorney, Agent, or Firm*—Edward D. Murphy

[57] ABSTRACT

A stud holder for a stud-welding device with a through-duct has an outlet orifice and a first holder with resilient holding fingers which extend in the longitudinal direction of the through-duct and each have, in the region of the outlet orifice, holding portions distributed round a periphery of the through-duct. The device further comprises at least one second holder with resilient holding fingers which extend in the longitudinal direction of the through-duct over a proportion of its length, each holding finger having, at one end region, a holding portion which rests on a circumference of the through-duct, the holding portions of the holding fingers of the second holder and optionally of each further holder ending before the holding portions of the holding fingers of the first holder.

20 Claims, 4 Drawing Sheets

STUD HOLDER FOR A STUD-WELDING DEVICE

BACKGROUND OF THE INVENTION

The present invention relates to a stud holder for a stud-welding device and to a stud-welding device with a stud holder.

A stud-welding device is known from DE 32 01 979 A1. The welding device has a stud holder by means of which a stud is held at least during a welding process. A stud is supplied to the stud holder via a supply duct which opens into a through-duct in the stud holder. The through-duct has an outlet orifice from which a stud projects when it has adopted its welding position in the stud holder. For holding a stud, the stud holder has resilient holding fingers which extend in the longitudinal direction of the through-duct and, in the region of the outlet orifice, each have a holding portion which is distributed over a periphery of the through-duct. The holding fingers simultaneously form an electrical contact to the stud.

The term stud covers articles having different external contours which can be welded to a metallic structure by means of a stud-welding device. For example, a weld stud with covering caps is known from DE 36 13 397 C2, wherein the weld stud has a cylindrical region to be grasped by a stud-welding device, to which a threaded shank of smaller diameter is connected to form a shoulder, and a covering cap of plastics material which can be arranged on the threaded shank until it contacts the shoulder. The cylindrical region passes via a step and a bevel with a reduction in diameter into the shoulder. The covering cap is provided with an elastic lip which, when expanded, covers the bevel when the covering cap rests on the shoulder. The cylindrical region to be grasped by the stud holder is relatively narrow so there is a risk during a welding process that the stud weld will not be secured in the correct position. An incorrectly positioned stud weld necessitates finishing work which, in particular in the case of mass production, is not acceptable. An oblique position which the stud can adopt in a stud holder is also dependent on the spatial orientation of the weld point to which the stud is to be welded. For example, the weld stud adopts an oblique position during overhead welding which is different from the position adopted during welding in which the weld stud is to extend substantially horizontally.

SUMMARY OF THE INVENTION

It is an object of the present invention to provide a stud holder for a stud-welding device by means of which a stud can be positioned in an exact position for welding.

The present invention provides a stud holder for a stud-welding device with a through-duct having an outlet orifice and with a first holder with resilient holding fingers which extend in the longitudinal direction of the through-duct and each have, in the region of the outlet orifice, holding portions distributed round a periphery of the through-duct, characterised by at least one second holder with resilient holding fingers which extend in the longitudinal direction of the through-duct over a proportion of its length, each holding finger having, at one end region, a holding portion which rests on a circumference of the through-duct, the holding portions of the holding fingers of the second holder and optionally of each further holder ending before the holding portions of the holding fingers of the first holder.

The present invention further comprises a stud welding device with a stud holder according to the invention.

The cross section of the through-duct is smaller than the cross section of a stud which can be guided through the through-duct so the resilient holding fingers are pressed radially outwardly during the passage of a stud. The resilient fingers of the first holder then lie non-positively on an external surface portion of a stud. The position of a stud within the through-duct is fixed by the resilient holding fingers of the first and second holder as the holding portions of the holding fingers of the second holder and optionally of each further holder end before the holding portions of the holding fingers of the first holder. Such a stud holder allows exact positioning of the stud. In particular, a secure electrical contact which also allows high current densities is thus formed between the holding portions and the stud.

A design of a stud holder in which the holding portions of the holding fingers of the second holder and optionally of each further holder end directly behind one another as viewed in the longitudinal direction of the through-duct is preferred. This design is preferred when using studs having a relatively small length.

If the stud holder is to be used in a stud-welding device by means of which relatively long studs are to be welded, it is proposed that the holding portions of the holding fingers of the second holder and optionally of each further holder end at a distance from one another in the longitudinal direction of the through-duct. At least two holding portions of the stud are thus created in one stud holder.

To enable relatively high current densities to be introduced into the stud without difficulty during a welding process, it is proposed that, as viewed in the circumferential direction of the through-duct, the overall length of the holding portions of the holding fingers of the first holder be greater than the overall length of the holding portions of the holding fingers of the individual further holders.

A design of a stud holder in which the second and each further holder has at least three holding fingers is preferred, the holding fingers being arranged equidistantly from one another as viewed in the circumferential direction. Such a design of stud holder is particularly desirable in the case of rotationally symmetrical studs as the axis of rotation of the stud lies in the centre of an area spanned by the three holding fingers.

With known stud holders, a stud is supplied to the stud holder by means of a feed arrangement. In order to keep the frictional forces occurring during the feeding of a stud in the stud holder as small as possible, it is proposed that the cross section of the through-duct be identical in the region of the holding portions of the holding fingers of individual holders.

If a stud has different cross sections as viewed in its longitudinal direction, it is beneficial to adapt the cross sections of the through-duct to the cross sections of the stud. For this purpose it is proposed that the cross section of the through-duct differ in the region of the holding portions of the holding fingers of individual holders. A design of stud holder is preferred in which at least a cross section of the through-duct in the region of the holding portions of the holding fingers of the second holder and optionally of each further holder is smaller than the cross section of the through-duct in the region of the holding portions of the holding fingers of the first holder, simplifying production of the stud holder.

The stud holder can be formed in that it has a substantially tubular base body into which slots or gaps extending over a proportion of the length of the base body in the longitudinal direction of the through-duct are introduced. The holding fingers of individual holders are preferably arranged alternately.

According to a further aspect of the invention, a stud holder is proposed which is designed as a base body with holding fingers of at least one holder and gaps are provided between the holding fingers, which gaps extend in the longitudinal direction of the through-duct and into which gaps the holding fingers of a further holder formed on a holding body engage. The holding body can preferably be detachably connected to the base body. In practice, the holding body can be pushed over the base body so the base body and the holding body form a constructional unit. This design of the stud holder makes the stud holder more flexible in use. Studs having different geometry and contours can be welded with a stud-welding device having the stud holder according to the invention by exchanging the holding body which can have different holding fingers.

BRIEF DESCRIPTION OF THE DRAWINGS

Four embodiments of a stud holder and a stud-welding device will now be described with reference to the accompanying drawings.

DESCRIPTION OF THE PREFERRED EMBODIMENT

Figure 1:
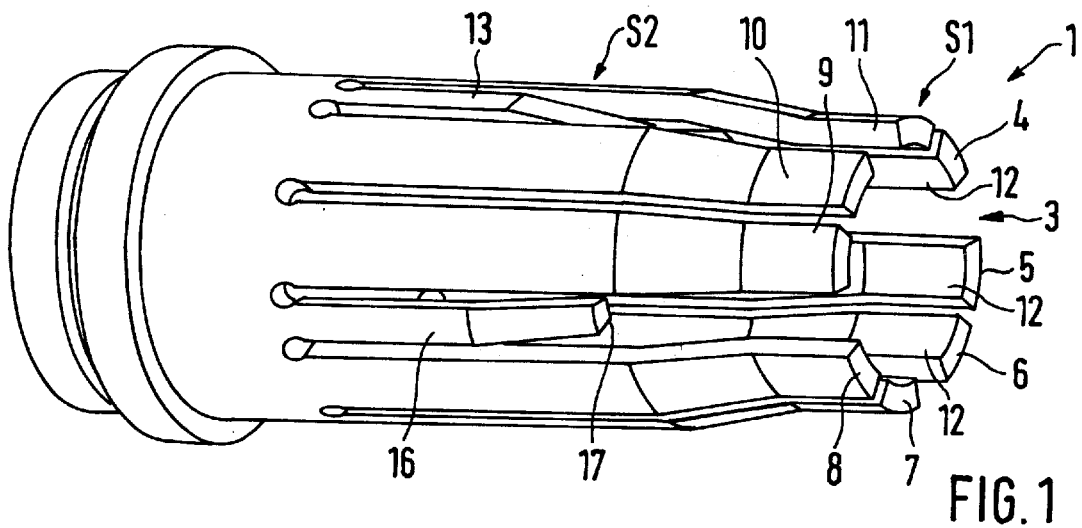
FIG. 1 is a perspective view of a first embodiment of a stud holder.
Figure 2:
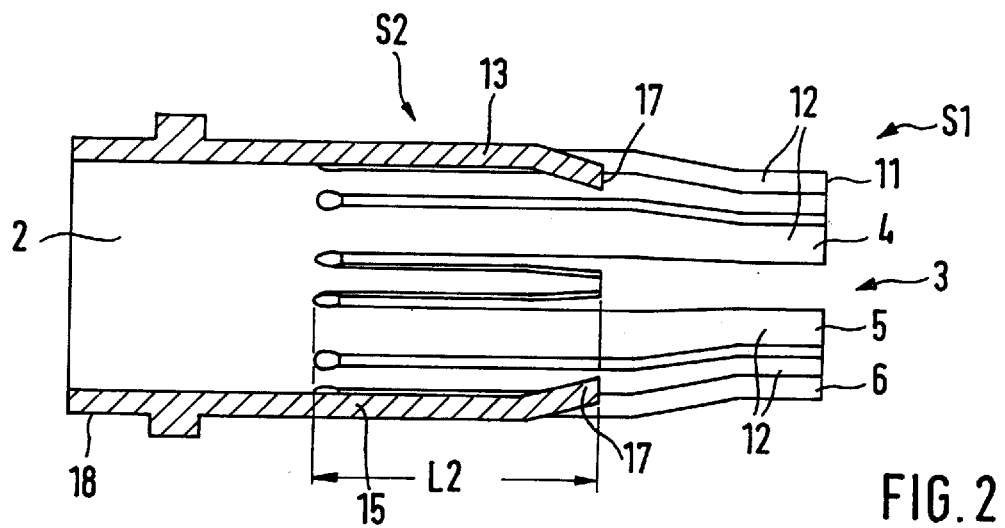
FIG. 2 is a longitudinal section of the stud holder according to FIG. 1.
Figure 3:
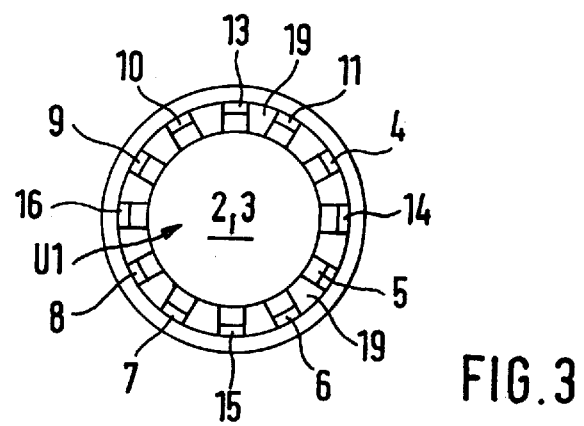
FIG. 3 is a front view of the stud holder according to FIG. 1.

FIGS. 1 to 3 show a first embodiment of a stud holder 1 for a stud-welding device. The stud holder 1 has a through-duct 2 with an outlet orifice 3. The stud holder 1 has a first holder S1. The first holder S1 has resilient holding fingers 4, 5, 6, 7, 8, 9, 10 and 11. The holding fingers 4 to 11 extend in the longitudinal direction of the through-duct 2. Each holding finger 4 to 11 has a holding portion 12 in the region of the outlet orifice 3. The holding portions 12 are distributed over a circumference U1 of the through-duct 2.

The stud holder 1 has a second holder S2 with resilient holding fingers 13, 14, 15 and 16. The holding fingers 13, 14, 15 and 16 of the second holder S2 extend in the longitudinal direction of the through-duct 2 over a proportion L2 of its length. Each holding finger 13, 14, 15 has, at one end region, a holding portion 17 which lies on a periphery U1 of the through-duct 2. As shown in FIGS. 1 and 2, the holding portions 17 of the holding fingers 13, 14, 15, 16 of the second holder S2 end before the holding portions 12 of the holding fingers 4, 5, 6, 7, 8, 9, 10 and 11 of the first holder S1.

Slots 19 which extend in the longitudinal direction of the through-duct 2 are formed in each case between the holding fingers 4, 5, 6, 7, 8, 9, 10, 11 of the first holder S1 and the holding fingers 13, 14, 15, 16 of the second holder S2. The width of the slots can differ.

The stud holder 1 is substantially tubular in design. The holding fingers of the first holder S1 and the holding fingers of the second holder S2 are formed in one piece. The stud holder has a common end region 18 from which the holding fingers 4 to 11 of the first holder S1 and the holding fingers 13 to 16 of the second holder S2 extend in the longitudinal direction of the through-duct 2. In the embodiment according to FIG. 1, the stud holder has an alternate arrangement of the holding fingers. A holding finger 13, 14, 15 and 16 of the second holder S2 follows two successive holding fingers 5, 6; 7, 8; 9, 10; 11, 4 of the first holder S1. The holding portions 17 of the holding fingers 13, 14, 15, 16 of the second holder S2 are arranged on the same circumference U1 of the through-duct 2 as the holding portions 12 of the holding fingers 4 to 11 of the first holder S1.

To achieve good electrical contact between the holding portions 12 of the holding fingers 4 to 11 of the first holder S1, the holding portions 12 have a greater overall length, as viewed in the circumferential direction, than the holding portions 17 of the holding fingers 13, 14, 15, 16 of the second holder S2. The holding portions 17 of the holding fingers 13, 14, 15, 16 are designed such that there is substantially linear contact between them and a stud.

Figure 4:
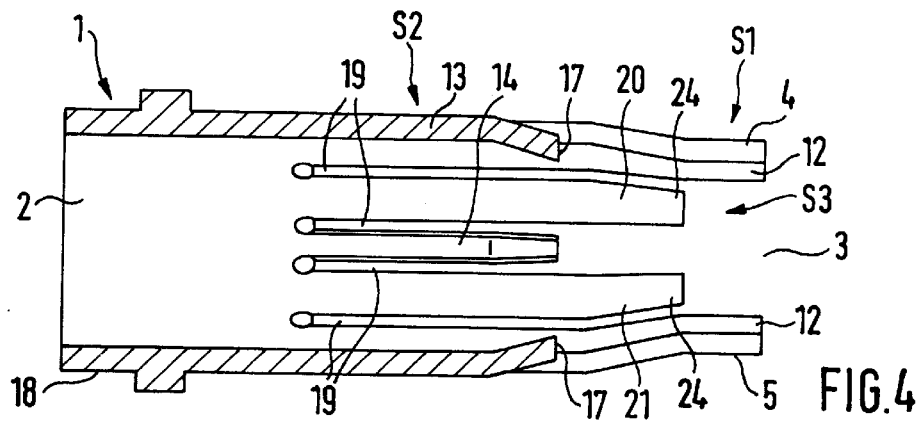
FIG. 4 is a longitudinal section of a second embodiment of a stud holder.
Figure 5:
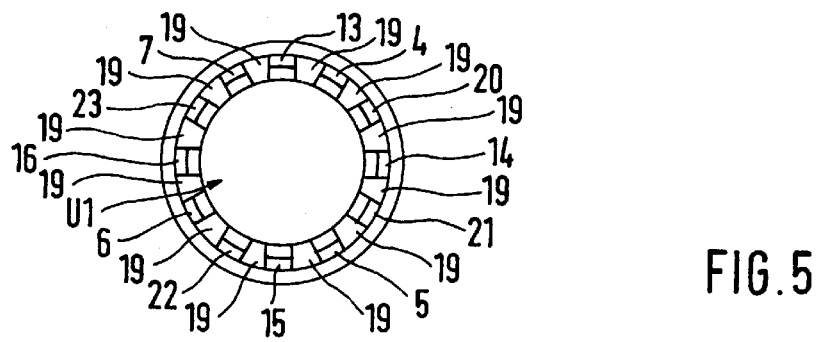
FIG. 5 is a front view of the stud holder according to FIG. 4.

FIGS. 4 and 5 show a second embodiment of a stud holder 1. The stud holder 1 has an end portion 18 from which holding fingers extend to the orifice in the longitudinal direction of the duct 2. In the embodiment illustrated, the stud holder 1 has a first holder S1 with the holding fingers 4, 5, 6, 7, a second holder S2 with the holding fingers 13, 14, 15, 16 and a third holder S3 with the holding fingers 20, 21, 22 and 23. The design of the first holder S1 and of the second holder S2 substantially corresponds to the design of the first embodiment of the stud holder in FIGS. 1 to 3. The holding fingers 20, 21, 22 and 23 of the third holder S3 are longer than the holding fingers 13, 14, 15, 16 of the holder S2 but shorter than the holding fingers 4, 5, 6, 7 of the first holder S1. Each holding finger 20, 21, 22, 23 of the third holder S3 has a respective holding portion 24 which is arranged on the circumference U1 of the through-duct 2. The holding portions 12 of the holding fingers 4, 5, 6, 7 of the first holder S1 and the holding portions 17 of the holding fingers 13, 14, 15, 16 of the second holder S2 also lie on the circumference U1. Improved centring of a stud within the through-duct 2 is achieved with the embodiments of the stud holder 1 shown in FIGS. 4 and 5 as the stud is held on three spaced portions within the through-duct 2.

Figure 6:
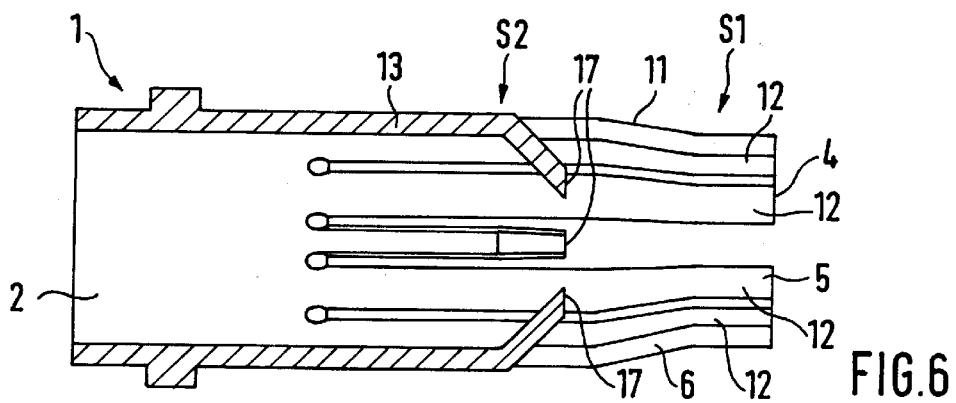
FIG. 6 is a further embodiment of a stud holder in a longitudinal direction.
Figure 7:
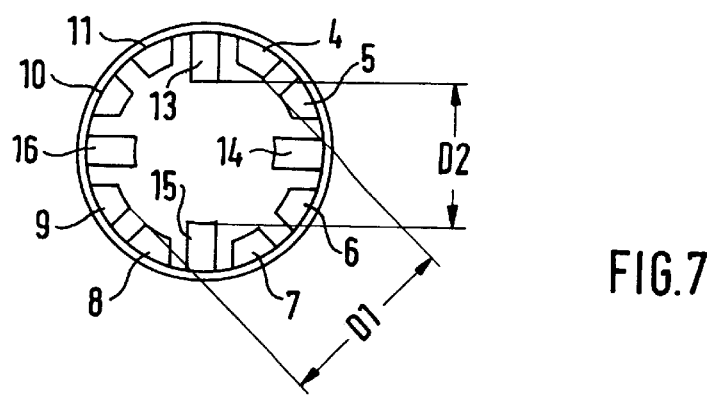
FIG. 7 is a front view of the stud holder according to FIG. 6.

We now refer to the further embodiment of a stud holder 1 shown in FIGS. 6 and 7. The stud holder 1 shown in FIGS. 6 and 7 substantially corresponds to the embodiment of a stud holder 1 as shown in FIGS. 1 to 3 and described. To avoid repetition, reference is made to the description of FIGS. 1 to 3. The embodiment of the stud holder 1 as shown in FIGS. 6 and 7 differs from the embodiment shown in FIGS. 1, 2 and 3 in that the holding fingers 13, 14, 15, 16 of the second holder S2 have holding portions 17 lying on a circular circumference of the through-duct 2, the diameter D2 of the circle being smaller than the diameter D1 of a circle on whose circumference the holding portions 12 of the holding fingers 4, 5, 6, 7, 8, 9, 10, 11 of the first holder S1 lie.

The embodiment shown in FIGS. 6 and 7 can also have a further holder, as shown in the embodiment according to FIGS. 4 and 5, the holding portions of the additional holder lying on the same circular circumference as the holding portions 12 of the holding fingers 4, 5, 6, 7, 8, 9, 10, 11 of the holder S1 or on the same circumference as the holding portions 17 of the holding fingers 13, 14, 15, 16 of the second holder S2. The holding portions of an additional holder can also be formed on a circumference different from the circumference of the first holder or of the second holder.

Figure 8:
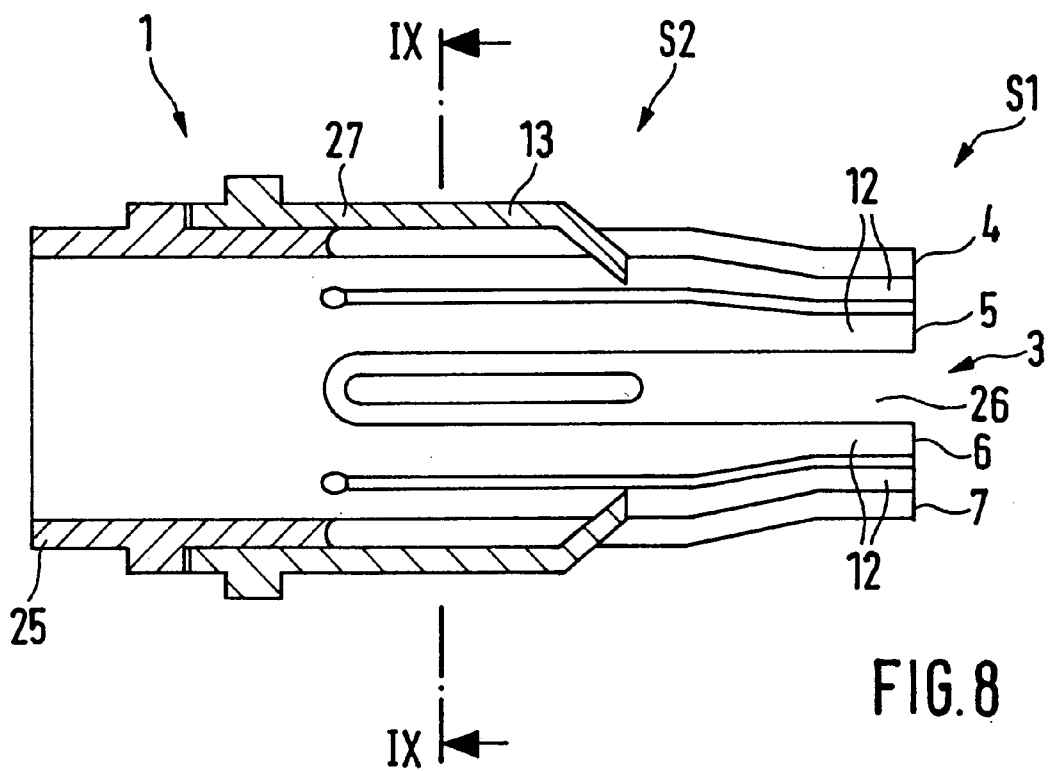
FIG. 8 is a fourth embodiment of a stud holder in a longitudinal section.
Figure 9:
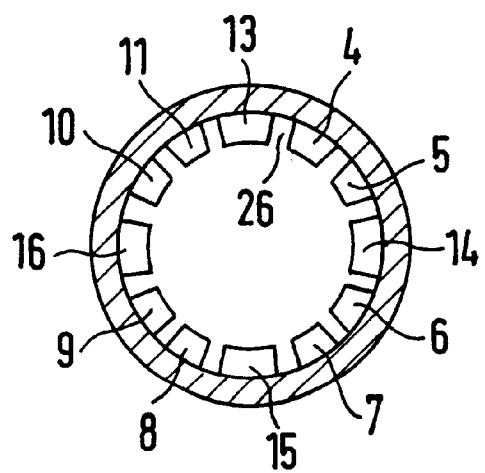
FIG. 9 is a side view of the stud holder according to FIG. 8 in section.

FIG. 8 shows a further embodiment of a stud holder 1. The stud holder 1 has a base body 25 which forms the first holder S1. The first holder S1 has holding fingers 4, 5, 6, 7, 8, 9, 10, 11. Each holding finger 4, 5, 6, 7, 8, 9, 10, 11 has a holding portion 12 which is formed in the region of the outlet orifice 3. Between the adjacent holding fingers 5, 6; 7, 8; 9, 10; 11, 4 there is formed a respective gap 26 in which a respective holding finger 13, 14, 15 or 16 of a second holder S2 engages. The holding fingers 13, 14, 15, 16 of the second holder S2 are formed on a holding body 27. The holding body 27 is slipped onto the base body 25. The holding body 27 can preferably be detachably connected to the base body 25. The holding fingers 13, 14, 15, 16 of the second holder can be of different geometry and design which have to be such that they can be passed through the gap 26. The stud holder 1 can be adapted to different studs by exchanging the holding body 27.

Figure 10:
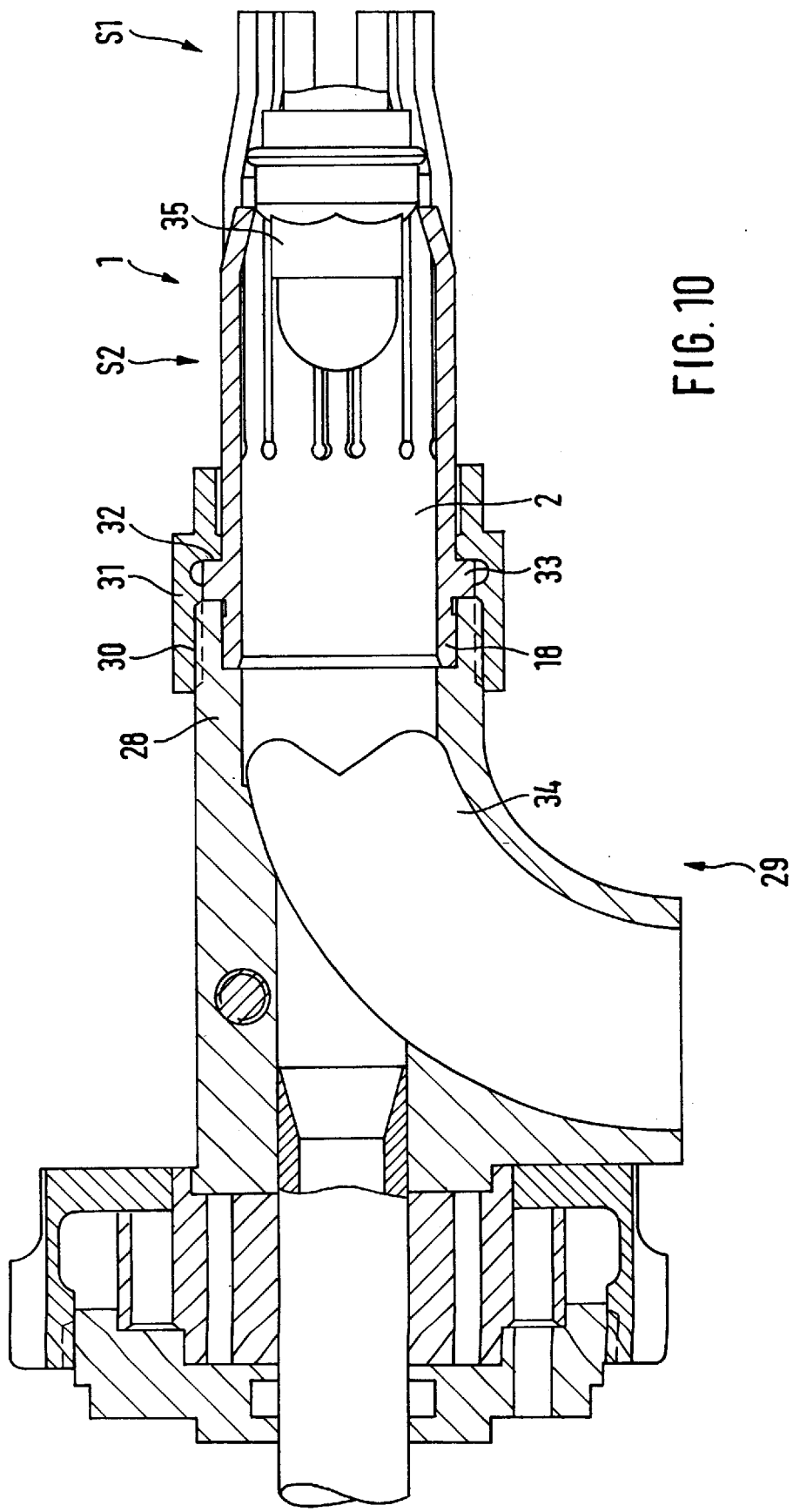
FIG. 10 is a schematic view of a stud-welding device with a stud holder according to FIG. 1.

FIG. 10 is a schematic view of a stud-welding device with a stud holder according to FIG. 1. The stud holder 1 projects with its ends portion 18 partially into a stud socket 28 in the stud-welding device 29. An external thread 30 is formed on the outer periphery of the stud socket 28. A screw cap 31 is screwed to the external thread 30. The screw cap 31 has a peripheral stop 32 which can be brought to rest on a peripheral collar 33 of the stud holder 1. The internal diameter of the duct 2 substantially corresponds to the internal diameter of the supply duct 34 of the stud-welding device 29. A stud 35 is supplied through the supply duct 34 to the stud holder 1. The holding fingers of the first holder S1 and of the second holder S2 come to rest on the external surface of the stud 35, so the stud 35 is held in an exact position in the stud holder 1 of the stud-welding device 29.

What is claimed is:

1. A stud holder for a stud-welding device, which comprises:

a through-duct having an outlet orifice at a first end thereof;

a common end region forming a portion of the through-duct at a location spaced from the first end thereof;

the common end region formed with an outboard end and an inboard end, with the outboard end being located at a second end of the through-duct opposite the first end thereof;

a first holder formed with a plurality of first-holder resilient holding fingers which are joined with and extend longitudinally in cantilever from the inboard end of the common end region in a direction away from the common end region for a first distance to the first end of the through-duct;

each of the plurality of first-holder resilient holding fingers formed with a holding portion located at a free end of the finger;

a second holder formed with a plurality of second-holder resilient holding fingers which are joined with and extend longitudinally in cantilever from the inboard end of the common end region in a direction away from the common end region toward the first end of the through-duct for a second distance which less than the first distance;

each of the plurality of second-holder resilient holding fingers formed with a holding portion located at a free end of the finger; and the holding portion of each of the first-holder resilient holding fingers being completely longitudinally displaced from the holding portion of each of the second-holder resilient holding fingers.

2. The stud holder as set forth in claim 1, which further comprises:

a third holder formed with a plurality of third-holder resilient holding fingers which are joined with and extend longitudinally in cantilever from the inboard end of the common end region in a direction away from the common end region for a third distance which is different from the first and second distances.

3. The stud holder as set forth in claim 2, which further comprises:

at least two of the second-holder resilient fingers being spaced apart to form a defined opening therebetween;

at least one of the first-holder resilient fingers being located in the defined opening; and at least one of the third-holder resilient fingers being located in the defined opening adjacent to the at least one of the first-holder resilient fingers.

4. The stud holder as set forth in claim 1, which further comprises:

each first-holder resilient holding finger has a third section which extends between the first section and the second section thereof and forms a radial-distance transition between the first radial distance and the second radial distance.

5. The stud holder as set forth in claim 4, which further comprises:

the holding portions of the first-holder resilient fingers, the second-holder resilient fingers and the third-holder resilient fingers being located from the axis of the through-duct by the same distance.

6. The stud holder as set forth in claim 1, which further comprises:

the holding portion of each of the second-holder resilient fingers being formed at an angle directed toward the axis of the through-duct.

7. The stud holder as set forth in claim 1, which further comprises:

the holding portions of the first-holder resilient fingers and the second-holder resilient fingers being located from the axis of the through-duct by the same distance.

8. The stud holder as set forth in claim 1, which further comprises:

at least two of the second-holder resilient fingers being spaced apart to form a defined opening therebetween; and at least two of the first-holder resilient fingers being located in the defined opening.

9. The stud holder as set forth in claim 1, which further comprises:

the holding portion of each of the first-holding resilient fingers being located radially from the axis of the through-duct by a first distance; and the holding portion of each of the second-holding resilient fingers being located from the axis of the through-duct by a second distance which is greater than the first distance.

10. The stud holder as set forth in claim 1, which further comprises:

connecting means formed on the through-duct for connecting the holder to a device.

11. A stud holder for a stud-welding device, which comprises:

a through-duct formed along an axis thereof and having an outlet orifice at a first end thereof;

a common end region forming a portion of the through-duct at a location spaced from the first end thereof;

the common end region formed with an outboard end and an inboard end, with the outboard end being located at a second end of the through-duct opposite the first end thereof;

a first holder formed with a plurality of first-holder resilient holding fingers which are joined with and extend longitudinally in cantilever from the inboard end of the common end region in a direction away from the common end region for a prescribed distance to the first end of the through-duct;

each of the plurality of first-holder resilient holding fingers formed with a holding portion located at a free end of the finger;

a second holder formed with a plurality of second-holder resilient holding fingers which are joined with and extend longitudinally in cantilever from the inboard end of the common end region in a direction away from the common end region toward the first end of the through-duct for a distance less than the prescribed distance;

each of the plurality of second-holder resilient holding fingers formed with a holding portion located at a free end of the finger;

a first section of each of the first-holder resilient holding fingers which is joined at one end thereof with the inboard end of the common end region located at a first radial distance from the axis of the through-duct; and a second section of each of the first-holder resilient holding fingers spaced from the first section thereof and located at a second radial distance from the axis of the through-duct which is less than the first radial distance.

12. The stud holder as set forth in claim 11, which further comprises:

a third holder formed with a plurality of third-holder resilient holding fingers which are joined with and extend longitudinally in cantilever from the inboard end of the common end region in a direction away from the common end region for a third distance which is different from the first and second distances.

13. The stud holder as set forth in claim 12, which further comprises:

at least two of the second-holder resilient fingers being spaced apart to form a defined opening therebetween;

at least one of the first-holder resilient fingers being located in the defined opening; and at least one of the third-holder resilient fingers being located in the defined opening adjacent to the at least one of the first-holder resilient fingers.

14. The stud holder as set forth in claim 11, which further comprises:

each first-holder resilient holding finger has a third section which extends between the first section and the second section thereof and forms a radial-distance transition between the first radial distance and the second radial distance.

15. The stud holder as set forth in claim 14, which further comprises:

the holding portions of the first-holder resilient fingers, the second-holder resilient fingers and the third-holder resilient fingers being located from the axis of the through-duct by the same distance.

16. The stud holder as set forth in claim 11, which further comprises:

the holding portion of each of the second-holder resilient fingers being formed at an angle directed toward the axis of the through-duct.

17. The stud holder as set forth in claim 11, which further comprises:

the holding portions of the first-holder resilient fingers and the second-holder resilient fingers being located from the axis of the through-duct by the same distance.

18. The stud holder as set forth in claim 11, which further comprises:

at least two of the second-holder resilient fingers being spaced apart to form a defined opening therebetween; and at least two of the first-holder resilient fingers being located in the defined opening.

19. The stud holder as set forth in claim 11, which further comprises:

the holding portion of each of the first-holding resilient fingers being located radially from the axis of the through-duct by a first distance; and the holding portions of each of the second-holding resilient fingers being located from the axis of the through-duct by a second distance which is greater than the first distance.

20. The stud holder as set forth in claim 11, which further comprises:

connecting means formed on the through-duct for connecting the holder to a device.

* * * * *